US010551990B2

(12) United States Patent
Kapadia et al.

(10) Patent No.: US 10,551,990 B2
(45) Date of Patent: *Feb. 4, 2020

(54) CONTEXTUAL BROWSER FRAME AND ENTRY BOX PLACEMENT

(71) Applicant: Microsoft Technology Licensing, LLC, Redmond, WA (US)

(72) Inventors: Ritika Kapadia, Newcastle, WA (US); Michael John Patten, Sammamish, WA (US); Sean Obafemi Lyndersay, Sammamish, WA (US); Melissa S. Kerr, Seattle, WA (US); Sean Gary Nordberg, Bellevue, WA (US); Marty Joseph Hall, Seattle, WA (US); Mark Yalovsky, Seattle, WA (US); Paula J. Chuchro, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 43 days.

This patent is subject to a terminal disclaimer.

(21) Appl. No.: 15/634,815

(22) Filed: Jun. 27, 2017

(65) Prior Publication Data

US 2017/0293400 A1   Oct. 12, 2017

Related U.S. Application Data

(63) Continuation of application No. 14/588,867, filed on Jan. 2, 2015, now Pat. No. 9,727,218.

(51) Int. Cl.
*G06F 3/0481* (2013.01)
*G06F 3/0484* (2013.01)
(Continued)

(52) U.S. Cl.
CPC .......... *G06F 3/0481* (2013.01); *G06F 3/0482* (2013.01); *G06F 3/0483* (2013.01);
(Continued)

(58) Field of Classification Search
CPC ............... G06F 3/04842; G06F 3/0481; G06F 17/30899; G06F 3/0488; G06F 16/9535;
(Continued)

(56) References Cited

U.S. PATENT DOCUMENTS 5,880,729 A * 3/1999 Johnston, Jr. ........... G06F 9/451
715/823
6,009,459 A * 12/1999 Belfiore .............. G06F 16/9566
709/203
(Continued)

FOREIGN PATENT DOCUMENTS

EP         2071440 A1      6/2009

OTHER PUBLICATIONS

White et al., "Investigating Behavioral Variability in Web Search," In Proceedings of the 16th International Conference on World Wide Web, http://delivery.acm.org/10.1145/1250000/1242576/p21-white.pdf?key1=1242576&key2=0498280121&coll=GUIDE&dl=GUIDE&CFID=27988212&CFTOKEN=25906092, 5 pages, May 8, 2017.
(Continued)

*Primary Examiner* — Andrew L Tank
(74) *Attorney, Agent, or Firm* — NovoTechIP International PLLC

(57) ABSTRACT

Various embodiments utilize context positioning of an input mechanism to convey at least one action associated with the input mechanism. At times, the input mechanism is associated with multiple actions. Input received via at the input mechanism can be analyzed to determine which action of the multiple actions to perform. In some embodiments, the input mechanism can be physically and/or visually moved to a different location based upon the determined action.

20 Claims, 9 Drawing Sheets

(51) Int. Cl.

| | | |
|---|---|---|
| *G06T 13/80* | (2011.01) | |
| *G06F 3/0483* | (2013.01) | |
| *G06F 3/0482* | (2013.01) | |
| *H04L 29/08* | (2006.01) | |
| *G06F 16/957* | (2019.01) | |
| *G06F 16/9535* | (2019.01) | |
| *G06F 17/27* | (2006.01) | |

(52) U.S. Cl.
CPC ........ *G06F 3/04842* (2013.01); *G06F 16/957* (2019.01); *G06F 16/9535* (2019.01); *G06T 13/80* (2013.01); *H04L 67/02* (2013.01); *G06F 17/27* (2013.01)

(58) Field of Classification Search
CPC .... G06F 3/0482; G06F 16/338; G06F 16/954; G06F 16/9577; G06F 3/0483; G06F 16/957; G06F 17/27; G06T 13/80; H04L 67/20
See application file for complete search history.

(56) References Cited

U.S. PATENT DOCUMENTS

| | | | |
|---|---|---|---|
| 6,895,430 B1 | 5/2005 | Schneider | |
| 7,225,407 B2 | 5/2007 | Sommerer et al. | |
| 7,565,627 B2 | 7/2009 | Brill et al. | |
| 8,332,381 B1* | 12/2012 | Coudron | G06F 3/048 |
| | | | 707/706 |
| 8,433,719 B1 | 4/2013 | Choc | |
| 8,504,925 B1* | 8/2013 | Haase | G06F 3/0481 |
| | | | 715/746 |
| 8,606,725 B1 | 12/2013 | Agichtein et al. | |
| 8,700,653 B2* | 4/2014 | Hansson | G06Q 30/0275 |
| | | | 707/767 |
| 8,732,569 B2 | 5/2014 | Burkard et al. | |
| 9,201,510 B2* | 12/2015 | Griffin | G06F 3/0237 |
| 9,377,926 B2* | 6/2016 | Wang | G06F 3/0481 |
| 9,430,794 B2 | 8/2016 | Isaacson et al. | |
| 9,529,440 B2* | 12/2016 | Piemonte | G06F 3/017 |
| 2005/0240576 A1 | 10/2005 | Piscitello et al. | |
| 2006/0026521 A1* | 2/2006 | Hotelling | G06F 3/0418 |
| | | | 715/702 |
| 2006/0036565 A1 | 2/2006 | Bruecken | |
| 2006/0077183 A1* | 4/2006 | Studt | G06F 3/0416 |
| | | | 345/173 |
| 2006/0218499 A1* | 9/2006 | Matthews | G06F 16/313 |
| | | | 715/765 |
| 2007/0174286 A1* | 7/2007 | Seitz | G06F 16/951 |
| 2007/0204232 A1* | 8/2007 | Ray | G06F 16/9577 |
| | | | 715/738 |
| 2007/0233692 A1* | 10/2007 | Lisa | G06F 3/04817 |
| 2008/0059419 A1* | 3/2008 | Auerbach | G06F 17/30867 |
| 2009/0150826 A1 | 6/2009 | Lyndersay et al. | |
| 2009/0327955 A1* | 12/2009 | Mouilleseaux | G06F 3/04812 |
| | | | 715/810 |
| 2010/0121936 A1* | 5/2010 | Liu | H04N 5/44543 |
| | | | 709/217 |
| 2012/0192089 A1 | 7/2012 | Kim et al. | |
| 2012/0272166 A1* | 10/2012 | Alkov | G06F 3/04815 |
| | | | 715/760 |
| 2012/0304073 A1* | 11/2012 | Mandic | G06F 17/30873 |
| | | | 715/745 |
| 2013/0086517 A1* | 4/2013 | Van Lancker | G06F 3/04815 |
| | | | 715/800 |
| 2013/0132887 A1 | 5/2013 | Amin et al. | |
| 2013/0235044 A1 | 9/2013 | Kaleta et al. | |
| 2017/0054812 A1* | 2/2017 | Hurley | G06F 3/0482 |

OTHER PUBLICATIONS

"International Search Report and Written Opinion Issued in PCT Application No. PCT/US2015/067749", dated Apr. 28, 2016, 12 Pages.

"Second Written Opinion Issued in PCT Application No. PCT/US2015/067749", dated Sep. 2, 2016, 8 Pages.

"International Preliminary Report on Patentability Issued in PCT Application No. PCT/US2015/067749", dated Nov. 29, 2016, 9 Pages.

"Non-Final Office Action Issued in U.S. Appl. No. 14/588,867", dated Sep. 27, 2016, 13 Pages.

"Notice of Allowance Issued in U.S. Appl. No. 14/588,867", dated Mar. 27, 2017, 9 Pages.

* cited by examiner

CONTEXTUAL BROWSER FRAME AND ENTRY BOX PLACEMENT

CROSS-REFERENCE TO RELATED APPLICATIONS

This application is a continuation of and claims the benefit of U.S. patent application Ser. No. 14/588,867, filed Jan. 2, 2015, and titled "CONTEXTUAL BROWSER FRAME AND ENTRY BOX PLACEMENT," which is hereby incorporated by reference in its entirety.

BACKGROUND

User Interfaces (UI) of applications display input mechanisms to provide a user with ways to interact with the application. Typically, an input mechanism is paired with a respective action. When an application provides the user with multiple ways for interaction, the UI can become more populated with multiple input mechanisms, and subsequently less populated with other content of interest. A user less familiar with the application may have difficulties understanding what actions are associated with the various input mechanisms.

SUMMARY

This Summary is provided to introduce a selection of concepts in a simplified form that are further described below in the Detailed Description. This Summary is not intended to identify key features or essential features of the claimed subject matter.

Various embodiments utilize context positioning of an input mechanism to convey at least one action associated with the input mechanism. At times, the input mechanism is associated with multiple actions. Input received via at the input mechanism can be analyzed to determine which action of the multiple actions to perform. In some embodiments, the input mechanism can be physically and/or visually moved to a different location based upon the determined action.

BRIEF DESCRIPTION OF THE DRAWINGS

The detailed description references the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments utilize context positioning of an input mechanism to convey at least one action associated with the input mechanism. For example, a text input box associated with a web page address can be visually displayed at a first location that is associated with navigation, while a text input box for a search engine can be visually displayed at a second location associated with searching. In some cases, an input mechanism can be associated with multiple actions. When the input mechanism is associated with multiple actions, some embodiments change the displayed location of the input mechanism based upon the input received to reflect the associated action being performed and/or how the input is interpreted. For example, a multi-purpose input mechanism can be initially displayed at a starting location associated with a first action, then moved to a second location associated with a second action after receiving input. Thus, in at least some embodiments, input received via at the input mechanism can be analyzed to determine which action of the multiple actions to take.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
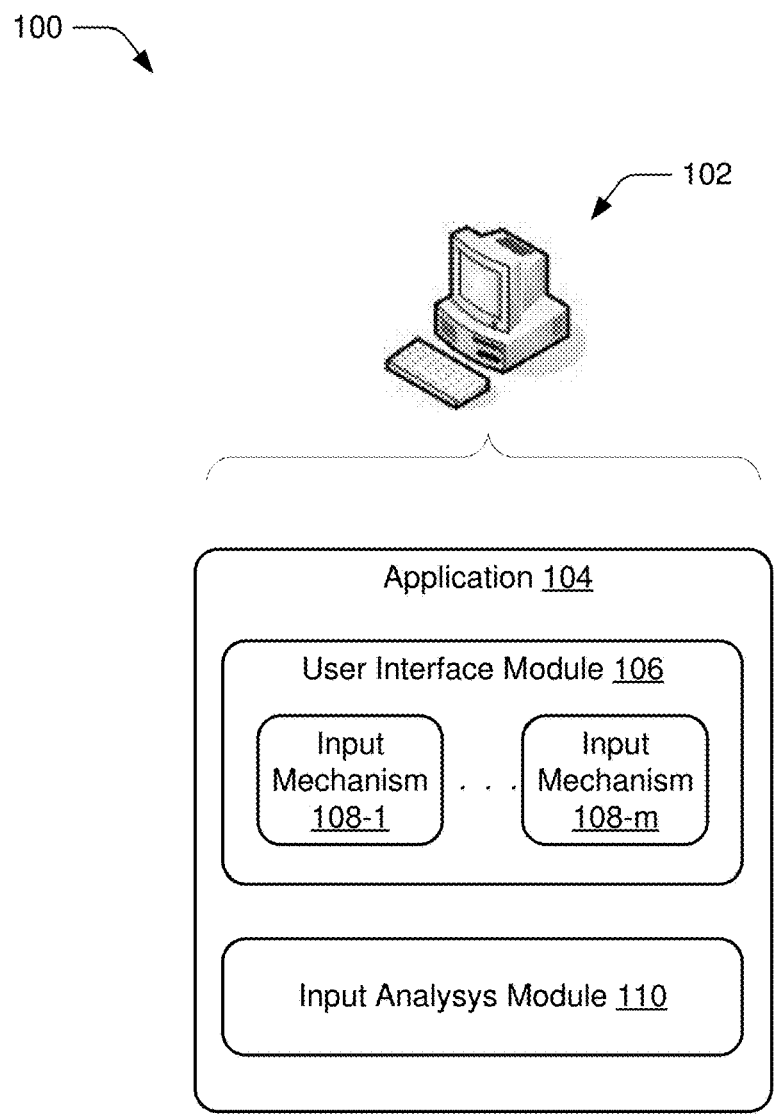
FIG. 1 is an illustration of an environment in an example implementation that is operable to perform the various embodiments described herein.

FIG. 1 illustrates an operating environment in accordance with one or more embodiments, generally indicated here as environment 100. Environment 100 includes computing device 102 in the form of a desktop personal computer. However, it is to be appreciated that this is merely for illustrative purposes, and that computing device 102 can be any suitable type of computing device such as, by way of example and not of limitation, a hand held tablet, a laptop, a mobile device, and so forth. Among other things, computing device 102 includes application 104.

Application 104 represents any suitable type of application that is executable by computing device 102 such as, by way of example and not of limitation, a web browser, a database application, a spreadsheet application, a directory navigation application, a word processing application, a coding editor, and so forth. In some embodiments, application 104 includes navigation capabilities (e.g. an ability to view, display, and/or access content based upon an input address) and searching capabilities (e.g. an ability to search for items based upon user input). Among other things, application 104 includes user interface module 106.

User interface module 106 represents functionality associated with exposing various aspects of application 104 to a user. In some cases, user interface module 106 displays content associated with application 104 on a display device of computing device 102. Alternately or additionally, user interface module 106 provides input mechanism(s) that enable a user to enter information and/or commands into application 104. User interface module 106 can include any number of input mechanisms, which are generally illustrated here as input mechanism(s) 108-1 through 108-m.

Input mechanism(s) 108-1 through 108-m represent any type and/or combination of input mechanisms that can be used to input information into an application such as, by way of example and not of limitation, a text input box, a radio button, a pull-down menu, a selectable icon, a selectable link, and so forth. Some embodiments display these input mechanisms on an associated display device via user interface module 106. In this example, "m" is used to represent an arbitrary number, and can range from one input mechanism to multiple input mechanisms. At times, a location where an input mechanism is displayed has an association with one or more particular actions and/or functionalities as further described above and below. Alternately or additionally, when an input mechanism is associated with multiple actions, the location of where it is displayed can change depending upon what type of input is received.

Application 104 also includes input analysis module 110. While input analysis module 110 is illustrated in FIG. 1 as being separate from user interface module 106, it is to be appreciated and understood that this is merely for discussion purposes, and that input analysis module can be included in user interface module 106 without departing from the scope of the claimed subject matter. Here, input analysis module 110 represents functionality that analyzes an input received via an input mechanism, and determines what type of input it is and/or what action to perform based upon the input. In at least one embodiment, input analysis module 110 can analyze an input text string and/or input characters and determine whether the input is associated with a navigable address (such as a Uniform Resource Locator (URL), a directory address, and so forth) or a key word search. Based upon the determination, the appropriate action associated with the input is then executed. Alternately or additionally, user interface module 106 can move a displayed location of the input mechanism from which input was received to a different region of the display that has an association and/or is in context with the executed action.

Having described an example operating environment in which an input mechanism can be displayed and/or moved based upon context positioning, consider now a more detailed discussion in accordance with one or more embodiments.

Context Positioning of an Input Mechanism

Input mechanisms allow a user to interact with an application and direct what actions the application executes. This can imply, however, that a user has knowledge related to what input mechanisms are associated with which actions, as well as what type of data to enter into the input mechanism. Thus, a first time user of an application, or a user who has not accessed the application recently, may struggle with figuring out which input mechanism to use. To further compound this problem, input mechanisms may evolve as new releases of the application are made available to have multiple purposes.

When developing a UI for an application, it can be helpful to share at least partial layouts between applications. By sharing UI layouts, a user can apply knowledge learned from a first application to a second application, such as where on the UI to find a particular type of input mechanism. For instance, if the first application has a "save" icon in an upper left hand corner of an associated UI, the user is more likely to look in this location when trying to perform a save action using the second application. This can be considered context positioning, where a displayed location and/or region is associated with a respective function. Some embodiments use context positioning to convey when an input mechanism has multiple actions associated with it.

Figure 2:
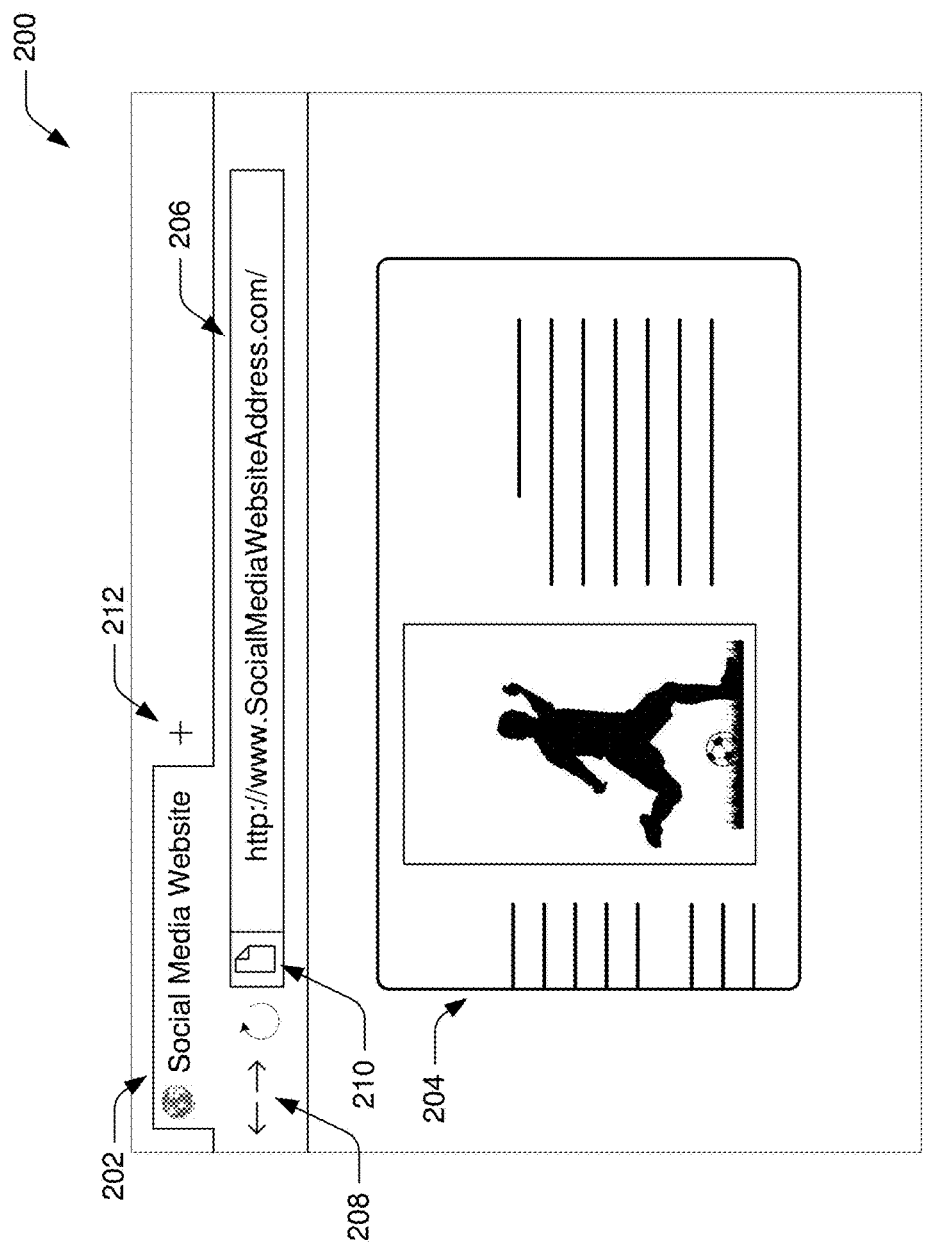
FIG. 2 is an illustration of an example implementation in accordance with one or more embodiments.

Consider FIG. 2, which illustrates user interface 200 of a web browser application. While this example describes user interface 200 in the context of a web browser application, it is to be appreciated that this is merely for discussion purposes, and that user interface 200 can be associated with any other suitable type of application without departing from the scope of the claimed subject matter. Here, the web browser application includes "tab" functionality. Among other things, a tab enables a user to switch between the respective content of tabs independently within the context of user interface 200 by activating different tabs (e.g. each tab has independent content from other tabs). For example, tab 202 is associated with a social media web site, and has corresponding content 204 being displayed. In addition to displaying content 204, tab 202 includes various input mechanisms that affect the content displayed in tab 202: input text box 206 and navigation controls 208. Thus, a tab of the web browser application can have independent controls and/or actions from other tabs within the context of user interface 200. While user interface 200 is illustrated as displaying a single tab, it is to be appreciated that this is merely for discussion purposes, and that any suitable number of tabs can be concurrently displayed within the context of user interface 200.

Input text box 206 represents an input mechanism that can be used by a user to enter an address into the web browser application to navigate to and/or pull content from. Alternately or additionally, a user can enter other types of data into input text box 206, as further described below. Here, the address is represented by the text string "http://www.SocialMediaWebsiteAddress.com/". Some embodiments convert the entered text string into an Internet Protocol (IP) address to be further used during the navigation process. It is to be appreciated, however, that any suitable type of address can be entered. In this example, input text box 206 is positioned above content 204, towards the upper fifth portion of user interface, and near navigation controls 208. In some embodiments, the location at which input text box 206 is displayed has an association with a navigation action. For example, previous applications created by a same developer and/or other developers may have used this same location, or similar positioning (such as simply above the associated displayed content and/or somewhere in the upper fifth portion of a user interface), for navigation address input. Based upon these previous experiences, a user accessing user interface 200 of the web browser application may use this context positioning to interpret input text box 206 as being associated with a navigation address simply based upon its location and not on any other identifying data and/or text. Thus, the displayed location of input text box 206 can be used to give a user a visual cue that input text box 206 can receive input associated with navigation. The illustrated location of input text box 206 is merely for discussion purposes, and it is to be appreciated that any other suitable displayed location could be utilized without departing from the scope of the claimed subject matter.

Navigation controls 208 represent input mechanisms associated with navigation actions. For example, navigation controls 208 includes a selectable left-pointing arrow control that, when selected, is configured to navigate to an address that was used prior to the current navigation address in input text box 206, and display content associated with that prior address. Similarly, navigation controls 208 includes a selectable right-pointing arrow control configured to, when selected, navigate to an address that was used after the current navigation address in input text box 206, and display its associated content. Navigation controls 208 also includes a selectable arced arrow that, when selected, is configured to refresh and/or update the content of the current navigation address by reacquiring the content. As in the case of input text box 206, some embodiments use the displayed location of navigation controls 208 to convey that these controls are associated with navigation (e.g. displayed adjacent to, above, and/or below input text box 206).

Tab 202 also includes input indicator 210. In some embodiments, when input text box 206 is configured as a multi-purpose input mechanism, user interface 200 and/or tab 202 displays a function indicator to visually notify a user how input in input text box 206 is being interpreted and/or what action was recently performed based upon the input. Here, input indicator 210 contains an image that is used to signify input text box 206 is currently being utilized as a navigation address box (i.e. an image of a web page, an image of content, an image of a globe, and so forth) and/or the current input is being interpreted as a navigable address. Further, the association between input indicator 210 and input text box 206 can be visually conveyed by placing them in close proximity to one another, such as in this example where input indicator 210 and input text box 206 are side by side and connected to one another. Thus, not only can input text box 206 be configured as a multi-functional input mechanism, but a visual indicator can be used to convey which action is either currently being performed based upon input from input text box 206 and/or how the input is being interpreted.

User interface 200 also includes new tab control 212, which represents an input mechanism associated with opening a new "tab". Here, new tab control 212 is illustrated as a selectable "+", and is visually placed in a location that is adjacent to, but outside of, tab 202. In some cases, the context of this placement implies an associated action and/or functionality that is external to (and/or independent of) tab 202. When selected, the web browser application opens a new tab window within user interface 200, as further described below.

Figure 3A:
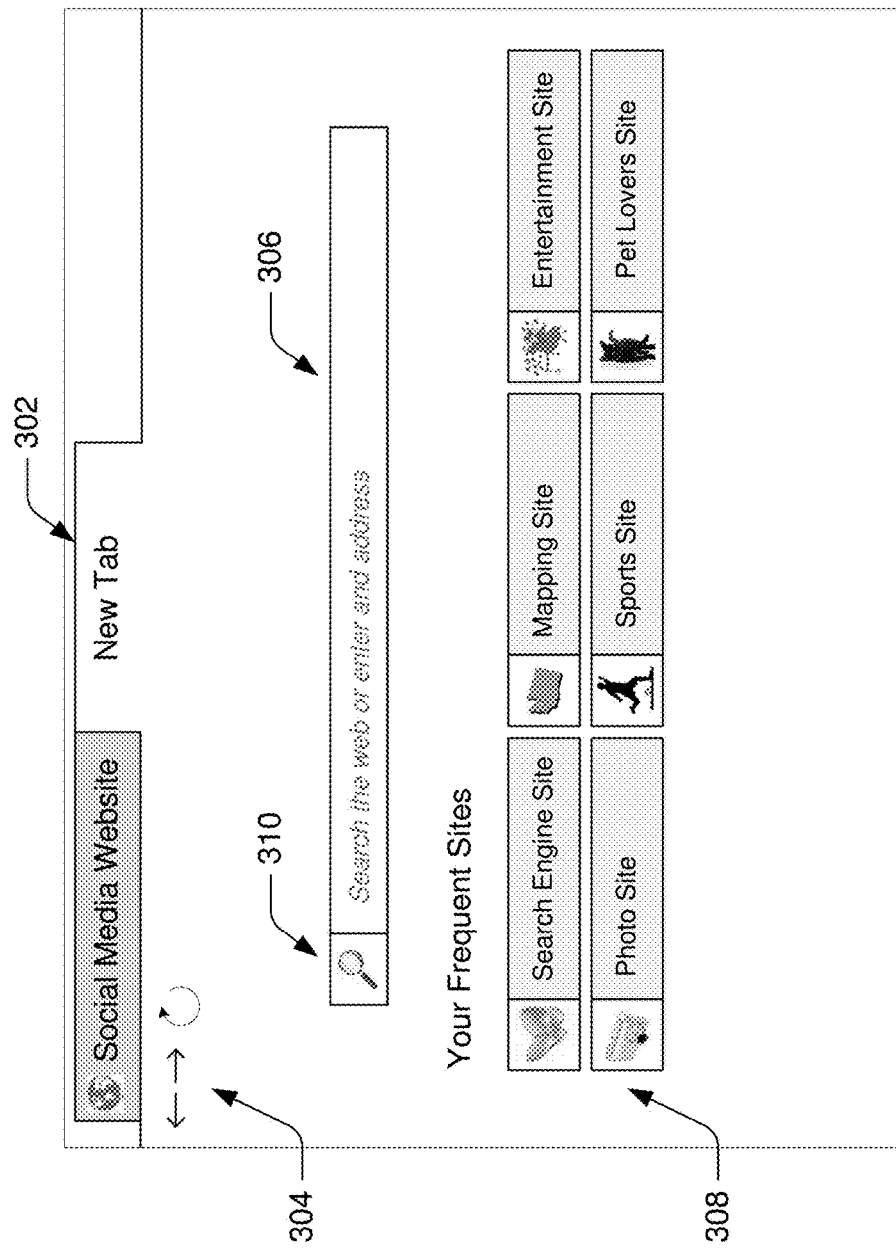
FIGS. 3a-e are illustrations of an example implementation in accordance with one or more embodiments.

Now consider FIGS. 3a-e, which illustrate an example of how the displayed location of a multi-functional input mechanism can change as its input changes. FIG. 3a represents an example user interface that is displayed when a user opens new tab 302 on a web browser application, such as through selection of new tab control 210 of FIG. 2. Similar to navigation controls 208 and input text box 206 of tab 202, new tab 302 includes navigation controls 304 and input text box 306. Navigation controls 304 are selectable controls that perform navigation operations within the context of new tab 302, while input text box 306 receives input within the context of new tab 302, as further described below. As in the case above, while this example is described in the context of a web browser application, it is to be appreciated and understood that any other suitable type of application can be utilized without departing from the scope of the claimed subject matter.

Among other things, input text box 306 is a multi-function input mechanism that receives different input types that cause different actions to be performed by the web browser application based upon the input type. For example, in some embodiments, input text box 306 is configured to receive a text string as input. In turn, the input type associated with the text string can be based upon the configuration and/or sequence of the characters within the text string (i.e. a first sequence being associated with a key word search input, a second sequence being associated with a navigation address input, and so forth). Here, the displayed position of input text box 306 is at a location associated with searching functionality such as a similar position to an input text box associated with a search engine (i.e. a position that is lower and more centered on a user interface when compared to the displayed position of a navigation address box, a position that is below navigation controls 304, above content 308, and centered, etc.). Thus, as in the case above, the displayed location of input text box 306 can be used to give a user a visual cue that input text box 06 can receive input associated with searching. Alternately or additionally, input text box 306 can be displayed in a seamless manner with content 308 (i.e. there is a fluid and/or continuous transition between the regions containing input text box 306 and content 308, a browser frame containing input text box 306 is displayed with a page containing content 308 in a manner that gives a visual appearance that they are part of a same surface, etc.).

In some embodiments, an animation can be used that visually moves input text box 306 from a first location to a second location when tab 302 is newly opened (such as a starting location associated with a navigation address box to an ending location associated with searching functionality). The animation that moves the displayed location of input text box 306 can be based on the various functions that can be accessed through input text box 306, as further described below. The animation can be accomplished in any suitable manner, such as through the use of Extensible Application Markup Language (XAML), HyperText Markup Language (HTML), and so forth. Based upon this context positioning, the UI influences a user looking at new tab 302 to interpret input text box 306 as a search input mechanism. Alternately or additionally, some embodiments remove navigation controls 304 from new tab 302 while input text box 306 is in a location associated with searching to further reinforce to a user that input text box 306 can be used as a search tool. It is to be appreciated that the illustrated position of input text box 306 is merely for discussion purposes, and that any other suitable display position can be used without departing from the scope of the claimed subject matter.

New tab 302 also includes content 308 and input indicator 310. Content 308 is displayed below input text box 306 and includes a group of selectable links, such as links to the most frequented web sites, links to bookmarked web sites, links to most recently visited web sites, and so forth. Similar to input indicator 212, input indicator 310 is displayed in a position adjacent to input text box 306, and contains an icon of a magnifying glass to further indicate that input text box 306 is associated with searching functionality. Any suitable type of searching functionality can be used, such as searching with an Internet search engine, searching a database, searching a document, and so forth. In some embodiments, input indicator 310 identifies a default action and/or a default interpretation of input received via input text box 304.

Figure 3B:
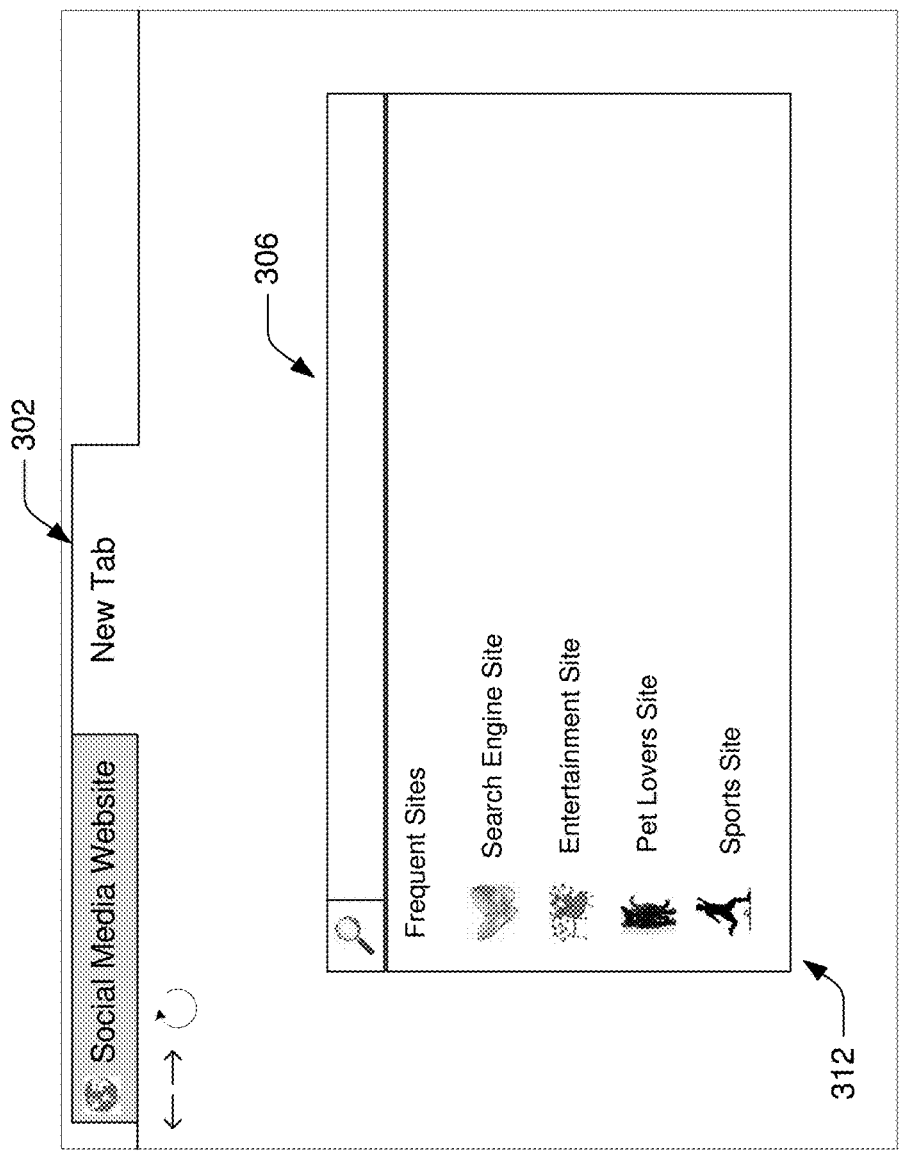

Now consider FIG. 3b. Here, input text box 306 has been activated by a user. This can be achieved in any suitable manner, such as through a mouse selection placed within the boundary lines of input text box 306, a touch-screen selection of input text box 306, and so forth. In some embodiments, drop down menu 312 is displayed upon activation and/or selection of input text box 306. Drop down menu 312 can include any suitable type of data, such as selectable links, key word search suggestions, and so forth, that can be selected as input into input text box 306. Thus, drop down menu 312 can include any type of input that is consumable by input text box 306 and/or can invoke one of the functionalities associated with input text box 306.

Figure 3C:
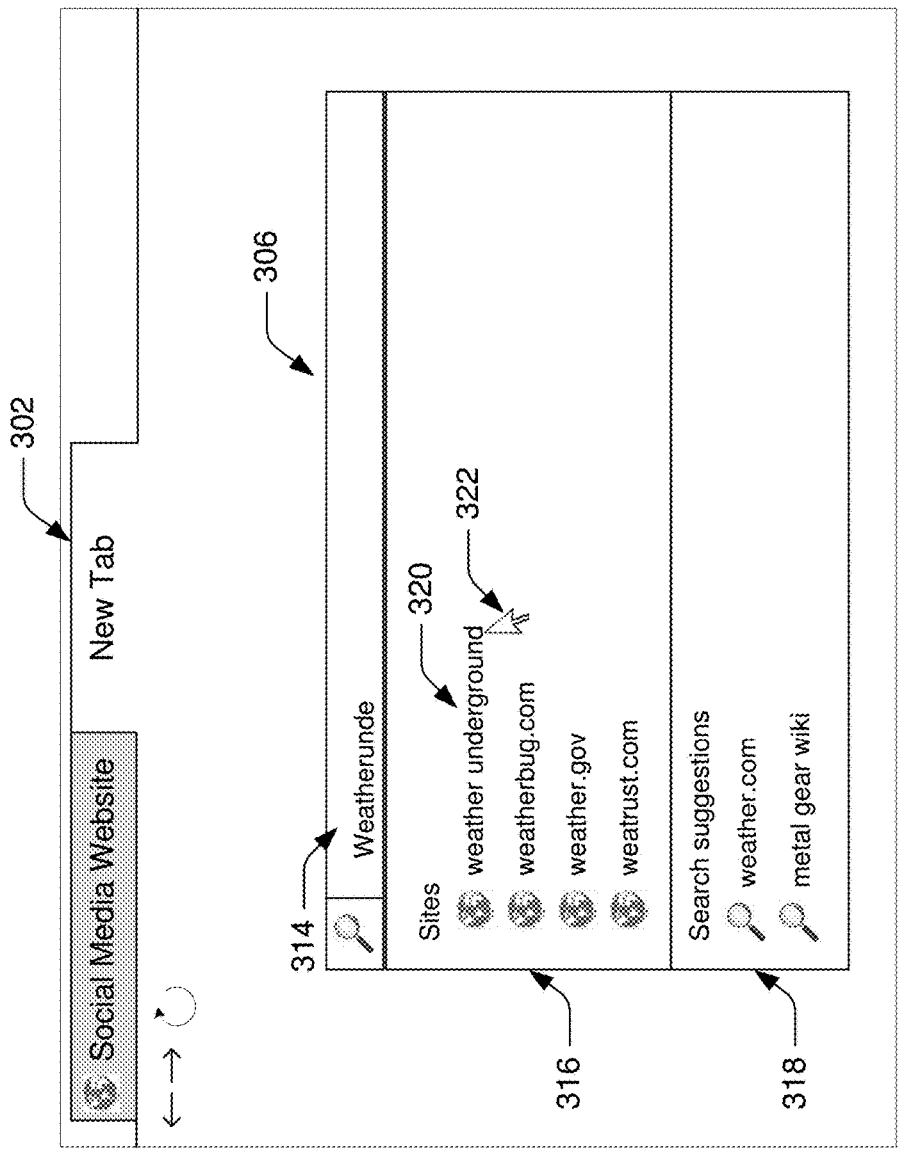

Moving forward, now consider FIG. 3c. In FIG. 3c, a user begins typing input 314 into input text box 306 (e.g. text string "Weatherunde"). In turn, this input is analyzed to determine whether it is a key word search input or a navigation address input. For example, the characters of input 314 can be analyzed for predetermined sequences and/or identifiers that are used to determine what type of input is being received via input 314. Some embodiments search for "space" character(s) to identify when multiple words are input, and subsequently associate that input with searching. Alternately or additionally, some embodiments look for characters that identify a protocol prefixes (i.e. "http"), and subsequently associate that input with navigation. Some embodiments analyze input 314 each time a character entered, while other embodiments wait for an "enter" or "return" command.

At times, the content of drop down menu 312 can change based upon input 314. For example, the content of the drop down menu can suggest various inputs that pertain to the different functionalities associated with input text box 306. To further illustrate, consider the above case where input text box 306 is associated with searching and navigation. As input 314 is received (or after input 314 is received), the drop down menu can be configured to display two separate regions with suggested inputs for each action based on input 314. Here, region 316 includes navigation links to various suggested web sites based upon input 314, while region 318 includes various key word search suggestions based upon input 314. In some embodiments, each region uses a unique indicator by their respective suggestions (e.g. a globe in region 316 to signify each entry as a navigation address input, and a magnifying glass in region 318 to indicate each entry as a key word search input) to further signify the different types associated with the suggestions.

In some embodiments, a user can invoke an action through input text box 306 in several ways. A first option is to activate an "enter" or "return" command that submits input 314 in its entirety as input. In this case, input 314 can be analyzed to determine which functionality of input text box 306 is best suited for input 314. In some cases, when a type cannot be determined, a default action can be selected without any further analysis. A second option is to make a selection from one of the suggested inputs in region 316, while a third option is to make a selection from one of the suggested inputs in region 318. Depending upon which region a selection is made from, the associated web browser application then performs the respective task. In this example, link 320 is selected by a user through a selection through mouse pointer 322. This selection then submits a navigation address associated with link 320 into input text box 306 as its respective input. Conversely, had a suggested input been selected from region 318, a searching functionality could be performed using the selected input as the key word search.

Figure 3D:
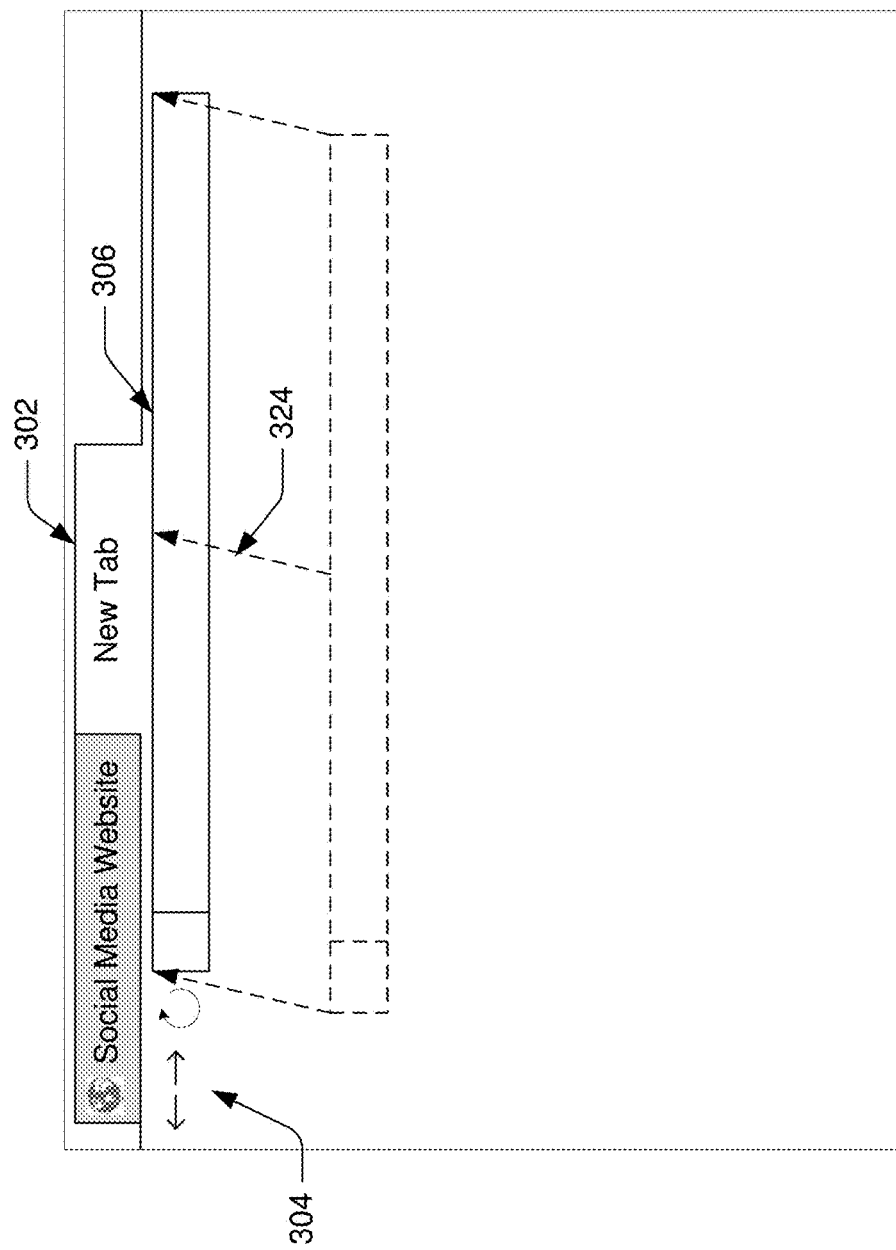

Now consider FIG. 3d, which illustrates a repositioning of input text box 306 in accordance with one or more embodiments. For simplification purposes, content from previous figures is not included. Recall the positioning of input text box 306 in FIGS. 3a-c. In these previous figures, input text box 306 was statically positioned at a location typically associated with searching functionality. However, in FIG. 3c, the user selects a navigation address as input, which is different from a search key word input. Some embodiments reposition input text box 306 based upon a type associated with a received input. Thus, to communicate the input type of link 320, as well as what functionality is being performed, input text box 306 is moved and/or repositioned from its starting location to a second location. This can be achieved in any suitable manner. Here, animation 324 visually displays input text box 306 moving from its starting location (e.g. search input box location) to its second location (e.g. navigation address location) in a seamless and continuous manner (e.g. a user can see the input box moving across the display and/or user interface to a destination location). While this transition is described as being seamless and/or continuous, it is to be appreciated that some embodiments utilize a digital implementation that breaks the "seamless" and "continuous" transition into predefined step sizes. Thus, in some embodiments, an analog transition between the first location and second location is modeled and/or achieved using digitized steps that give the appearance of a smooth and/or analog transition. Alternately or additionally, some embodiments simply move input text box 306 without a seamless and/or continuous transition as displayed by animation 324.

Figure 3E:
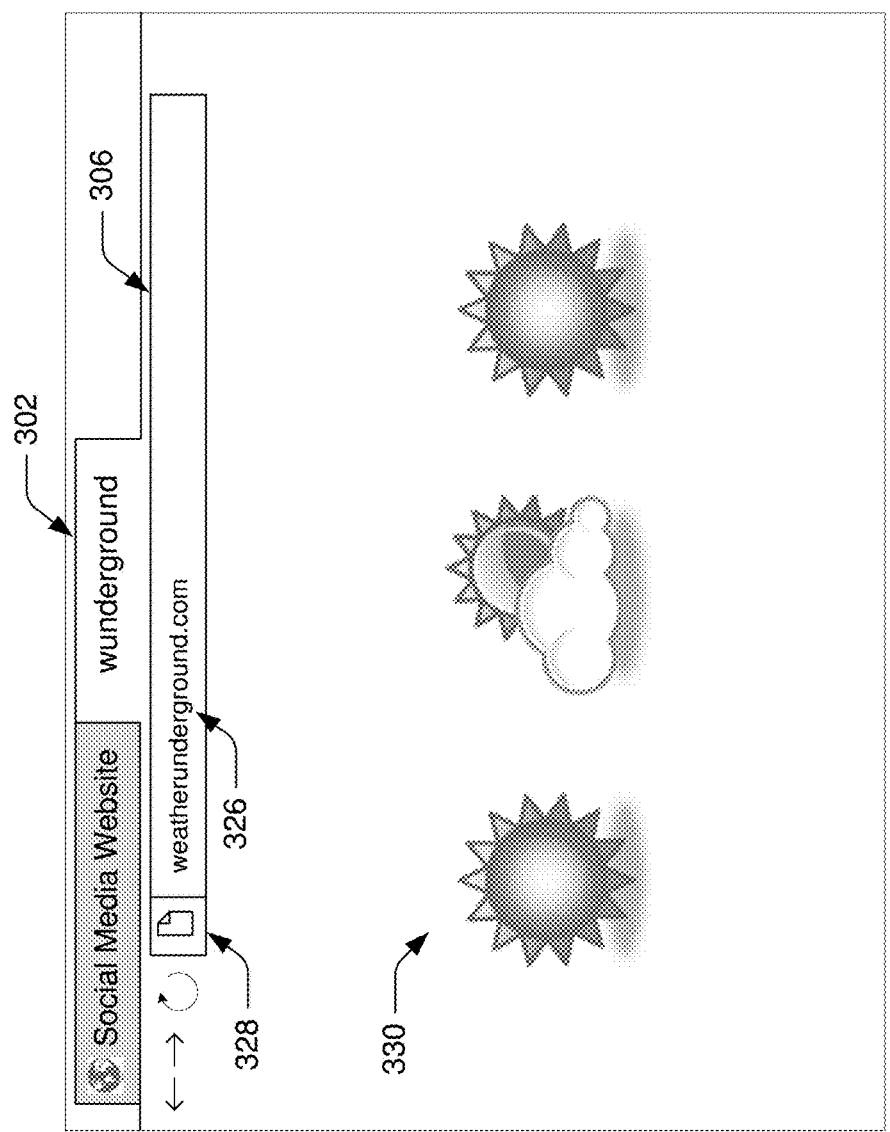

FIG. 3e illustrates new tab 302 after completion of an action based off of receiving selected input 320 (e.g. navigating to a web site associated with link 320). First, new tab 302 displays input text box 306 at a context position associated with navigation (e.g. a location similar to that of input text box 206 of FIG. 2). New tab 302 also displays a label, such as a title and/or description, associated with the navigated web site (e.g. "wunderground"), while input text box 306 includes input 326 in the form of an address the web browser application navigated to. In addition to displaying input text box 306 at a context position associated with navigation, new tab 302 includes input indicator 328 in the form of a document and/or web page to indicate that input 326 is being interpreted as a navigation address. Content 330 represents content pulled from the associated web site. Thus, new tab 302 received navigation address input, repositioned input text box 306 to reflect the input type, navigated to the particular input address, pulled content from the particular input address, and displayed the content as directed. Thus, as the input type changes for input text box 306, so does the displayed position.

Figure 4:
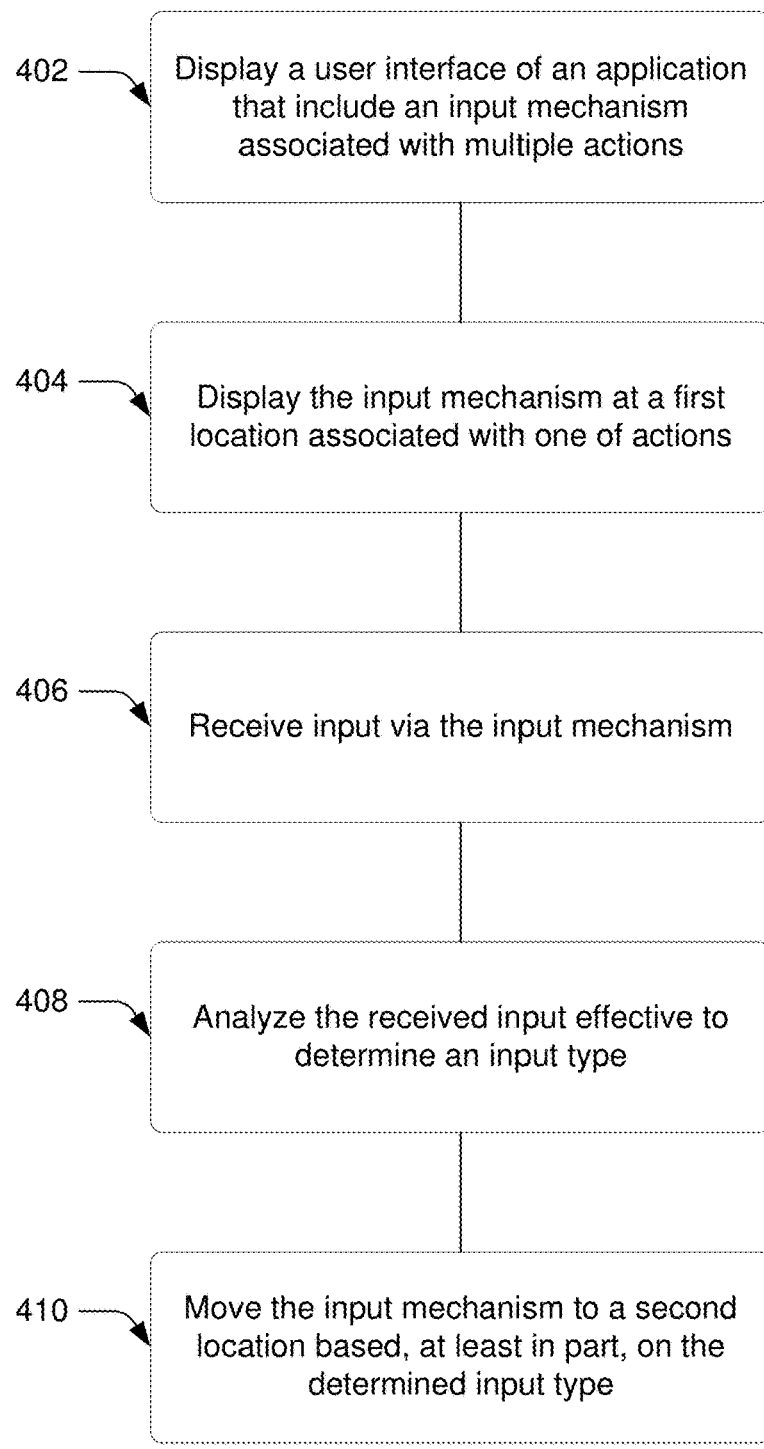
FIG. 4 is a flow diagram that describes steps in a method in accordance with one or more embodiments.

Now consider FIG. 4, which is a flow diagram that describes steps in a method in accordance with one or more embodiments. The method can be implemented in connection with any suitable hardware, software, firmware or combination thereof. In at least some embodiments, aspects of the method can be implemented by a suitably configured software module, such as user interface module 106, input mechanism 108, and/or input analysis module 110 of FIG. 1.

Step 402 displays a user interface of an application. The user interface includes an input mechanism that is associated with multiple actions. In some embodiments, the application is a web browser application. Alternately or additionally the input mechanism is a text input box is associated with at least two actions: navigation and searching. This can include navigating the web browser to a web site, inputting key words into a web based search engine, and so forth. However, as discussed above, any suitable application and/or input mechanism can be utilized without departing from the scope of the claimed subject matter.

Step 404 displays the input mechanism at a first location associated with a first action. For example, the input mechanism can be displayed at a location that has a same location context in multiple application (i.e. a save icon in an upper left hand corner of a user interface). In some embodiments, the first action can be one of the multiple actions associated with the input mechanism.

Step 406 receives input via the input mechanism. Any suitable type of input can be received, such as a text string, a binary value, a file, a menu selection, a radio button selection, a touch screen tap, a mouse pointer click, and so forth. Responsive to receiving the input, step 408 analyzes the input effective to determine an input type associated with the input. In some cases, when an input type cannot be determined, a default input type is selected. Alternately or additionally, the input is analyzed to determine characteristics, patterns, and/or identifiers. After an input type is determined, some embodiments map the input type to an action associated with the input mechanism. For example, referring to the above example of a web browser application, some embodiments analyze the received input and/or map the input type to an action when a new tab page is opened. A new tab page can be invoked in any suitable manner, such as through activation of a selectable link/icon through a mouse input device, touch input, keyboard, and so forth.

Step 410 moves the input mechanism to a second location based, at least in part, on the determined input type. In some cases, the second location has an association with a second action and/or has a same location context for the second action with multiple applications. As discussed above, some embodiments move the input mechanism to the second location using an animation that depicts the input mechanism moving across a display from the first location to the second location in a seamless manner. Alternately or additionally, the application can execute the second action using the received input.

Having considered a, consider now a discussion of implementation examples that employ the techniques described above.

Example System and Device

Figure 5:
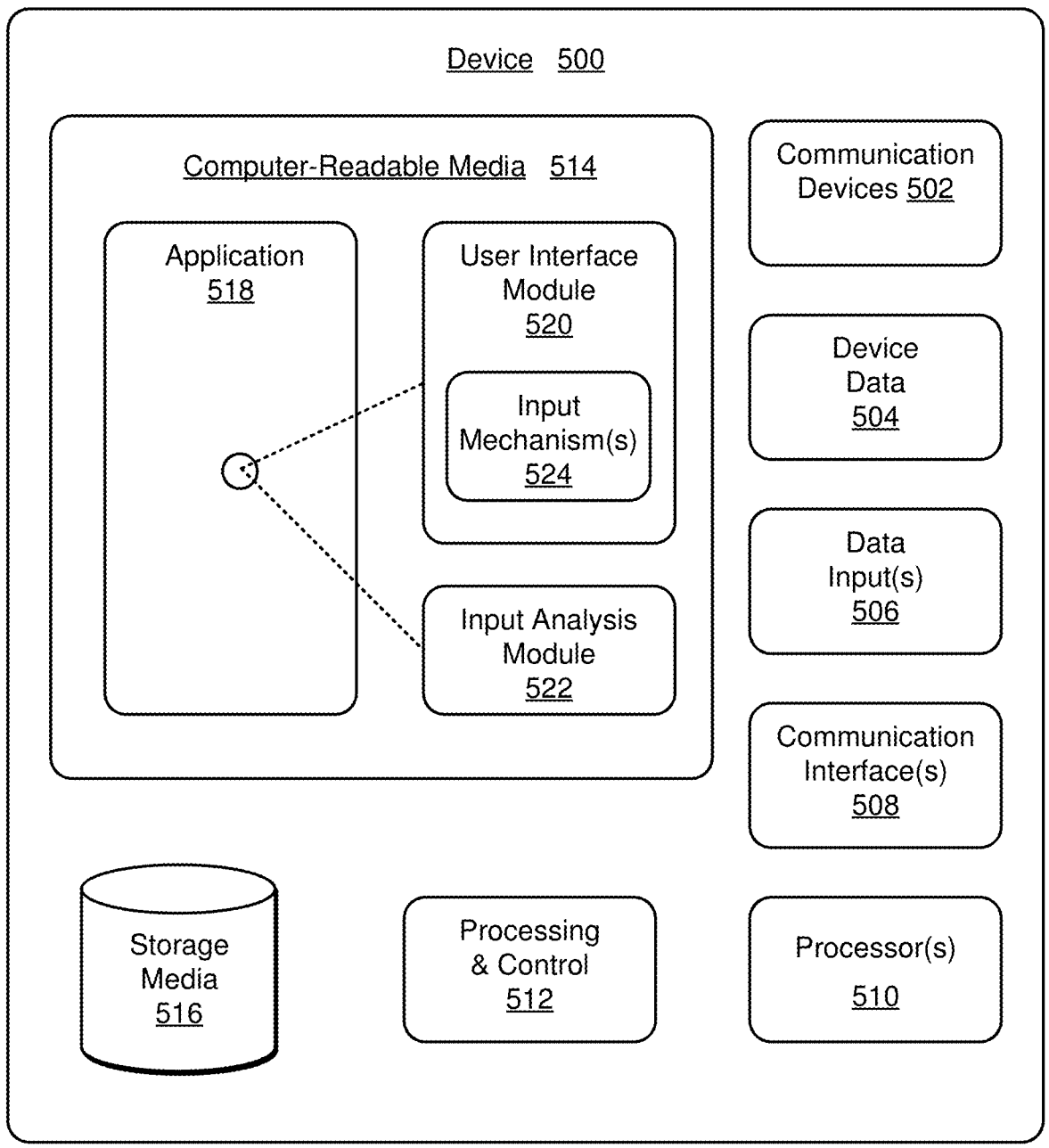
FIG. 5 illustrates various components of an example device that can be implemented as any type of computing device as described herein.

FIG. 5 illustrate various components of example device 500 that can be implemented as any type of computing device as described with reference to FIGS. 1-3 to implement embodiments of the techniques described herein. Device 500 is illustrative of an example device, such as computing device 102 of FIG. 1.

Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, messages, music, television media content, recorded video content, and any other type of audio, video, and/or image data received from any content and/or data source.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices communicate data with device 500.

Device 500 includes one or more processors 510 (e.g., any of microprocessors, controllers, and the like) which process various computer-executable instructions to control the operation of device 500 and to implement embodiments of the techniques described herein. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable media 514 provides data storage mechanisms to store the device data 504, as well as application 518 and any other types of information and/or data related to operational aspects of device 500. For example, Here, application 518 includes user interface module 520 and input analysis module 522. Application 518 can be maintained as a computer application with the computer-readable media 514 and executed on processors 510. Application 518 can also include any system components or modules to implement embodiments of the techniques described herein.

User interface module 520 displays aspects of application 518 on a display device, and includes input mechanism(s) 524 to allow for interaction with application 518. Input mechanism(s) 524 allow a user to input data and/or direct functionality executed by application 518. As further discussed above, an input mechanism can be associated with multiple functions, and further receive multiple types of data. In some embodiments, user interface module 520 changes the displayed location of input mechanism(s) 524 based upon the input data type. Input analysis module 522 analyses input received via input mechanism(s) 524 to determine an input data type. While illustrated separately from user interface module 520 here, other embodiments include input analysis module 522 within user interface module 520. These modules are shown as software modules and/or computer applications. However, these modules can alternately or additionally be implemented as hardware, software, firmware, or any combination thereof.

CONCLUSION

Various embodiments utilize context positioning of an input mechanism to convey at least one action associated with the input mechanism. At times, the input mechanism is associated with multiple actions. Input received via at the input mechanism can be analyzed to determine which action of the multiple actions to perform. In some embodiments, the input mechanism can be physically and/or visually moved to a different location based upon the determined action.

Although the embodiments have been described in language specific to structural features and/or methodological acts, it is to be understood that the various embodiments defined in the appended claims are not necessarily limited to the specific features or acts described. Rather, the specific features and acts are disclosed as example forms of implementing the various embodiments.

What is claimed is:
1. A system comprising:
at least one processor; and
one or more computer-readable memory or storage devices storing instructions which, upon execution by the at least one processor, cause the system to perform operations comprising:

displaying a user interface associated with a computing device, the user interface comprising at least one input mechanism associated with multiple actions;

displaying the at least one input mechanism at a first location associated with a first action of the multiple actions;

receiving input via the at least one input mechanism;

determining an input type associated with the received input; and upon determining that the input type is associated with a second action of the multiple actions and a second location rather than being associated with the first action and the first location, directing the at least one input mechanism to the second location.

2. The system of claim 1, wherein the first location provides a visual cue that the at least one input mechanism is configured to receive input associated with the first action, and wherein the second location provides a visual cue that that the at least one input mechanism is configured to receive input associated with the second action.

3. The system of claim 1, wherein the at least one input mechanism comprises an input text box.

4. The system of claim 1, wherein determining the input type comprises analyzing a received input text string.

5. The system of claim 1, wherein the first action comprises a searching function.

6. The system of claim 1, wherein the operations further comprise displaying a visual indicator configured to convey at least one action of the multiple actions associated with the application.

7. The system of claim 1, wherein the operations further comprise responsive to receiving the input, displaying at least one suggested input for each respective action of the multiple actions, each suggested input based, at least in part, on the received input.

8. One or more tangible computer-readable memory or storage devices storing instructions which, when executed, cause a computing system to perform operations comprising:

presenting a user interface on a display device, the user interface comprising at least one input mechanism associated with multiple actions, wherein the at least one input mechanism is presented at a first location associated with a first action of the multiple actions, and wherein the first location is effective to give a visual cue that the at least one input mechanism is configured to receive input associated with the first action;

receiving input via the at least one input mechanism;

analyzing the received input to determine an input type associated with the received input; and after determining that the input type is associated with a second action of the multiple actions and a second location, directing the at least one input mechanism to the second location, wherein the second location is effective to give a visual cue that the at least one input mechanism is configured to receive input associated with the second action.

9. The computer-readable memory or storage devices of claim 8, wherein the directing comprises moving the at least one input mechanism to the second location using an animation that moves the at least one input mechanism from the first location to the second location.

10. The computer-readable memory or storage devices of claim 9, wherein the animation is implemented, at least in part, using Extensible Application Markup Language (XAML).

11. The computer-readable memory or storage devices of claim 8, wherein:

the first action comprises a searching functionality associated with a web based search engine; and the second action comprises a navigation functionality.

12. The computer-readable memory or storage devices of claim 11, wherein the operations further comprise, responsive to receiving the input:

presenting at least one key word search input suggestion associated with the received input; and presenting at least one navigation suggestion associated with the received input.

13. The computer-readable memory or storage devices of claim 8, wherein the operations further comprise:

presenting a first visual indicator configured to convey the first action when the at least one input mechanism is displayed at the first location; and presenting a second visual indicator configured to convey the second action when the at least one input mechanism is displayed at the second location.

14. The computer-readable memory or storage devices of claim 8, wherein the operations further comprise analyzing the received input for one or more identifiers associated with an input data type.

15. A method, comprising:

displaying a user interface associated with an application, the user interface comprising an input text box configured to:

receive input that causes a web browser application to perform a search functionality; and receive input that causes the web browser application to navigate to an address;

displaying the input text box at a first location indicating navigation, the first location effective to give a visual cue that the input text box is configured to receive a navigation input;

receiving an input string via the input text box;

analyzing the input string to determine whether the input string is associated with a keyword search input or a navigation input; and based on a determination that the input string is associated with a keyword search input rather than a navigation input, moving the input string from the first location indicating navigation to a second location indicating search functionality, wherein the second location is effective to give a visual cue that the input string was determined to be associated with search functionality.

16. The method of claim 15, wherein moving the input string comprises moving the input text box using an animation that moves the input text box from the first location to the second location.

17. The method of claim 15, wherein the input text box is displayed with additional content in the user interface to give a visual appearance that the input text box and additional content are part of a same surface.

18. The method of claim 17, wherein the additional content comprises selectable links to historically frequented web sites.

19. The method of claim 15, further comprising analyzing the input string each time a character of the input string is entered.

20. The method of claim 15, wherein the input text box is positioned at the first location when a new tab associated with the web browser application is opened.

* * * * *